E. J. CHRISTIE.
UNICYCLE.
APPLICATION FILED JULY 6, 1914.
1,191,566.
Patented July 18, 1916.
2 SHEETS—SHEET 1.
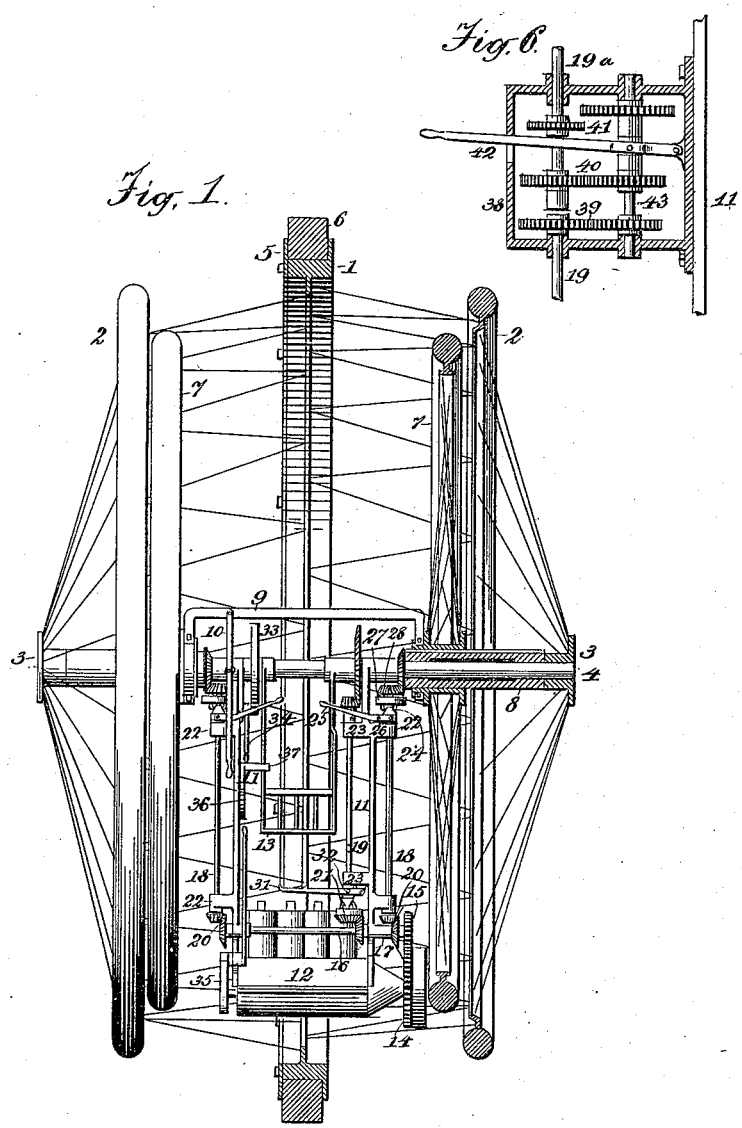
Witnesses
Geo. P. Carpenter
P. P. Buckmaster
Inventor
Elga J. Christie
By J. M. St. John
Atty.

E. J. CHRISTIE.
UNICYCLE.
APPLICATION FILED JULY 6, 1914.
1,191,566.
Patented July 18, 1916.
2 SHEETS—SHEET 2.
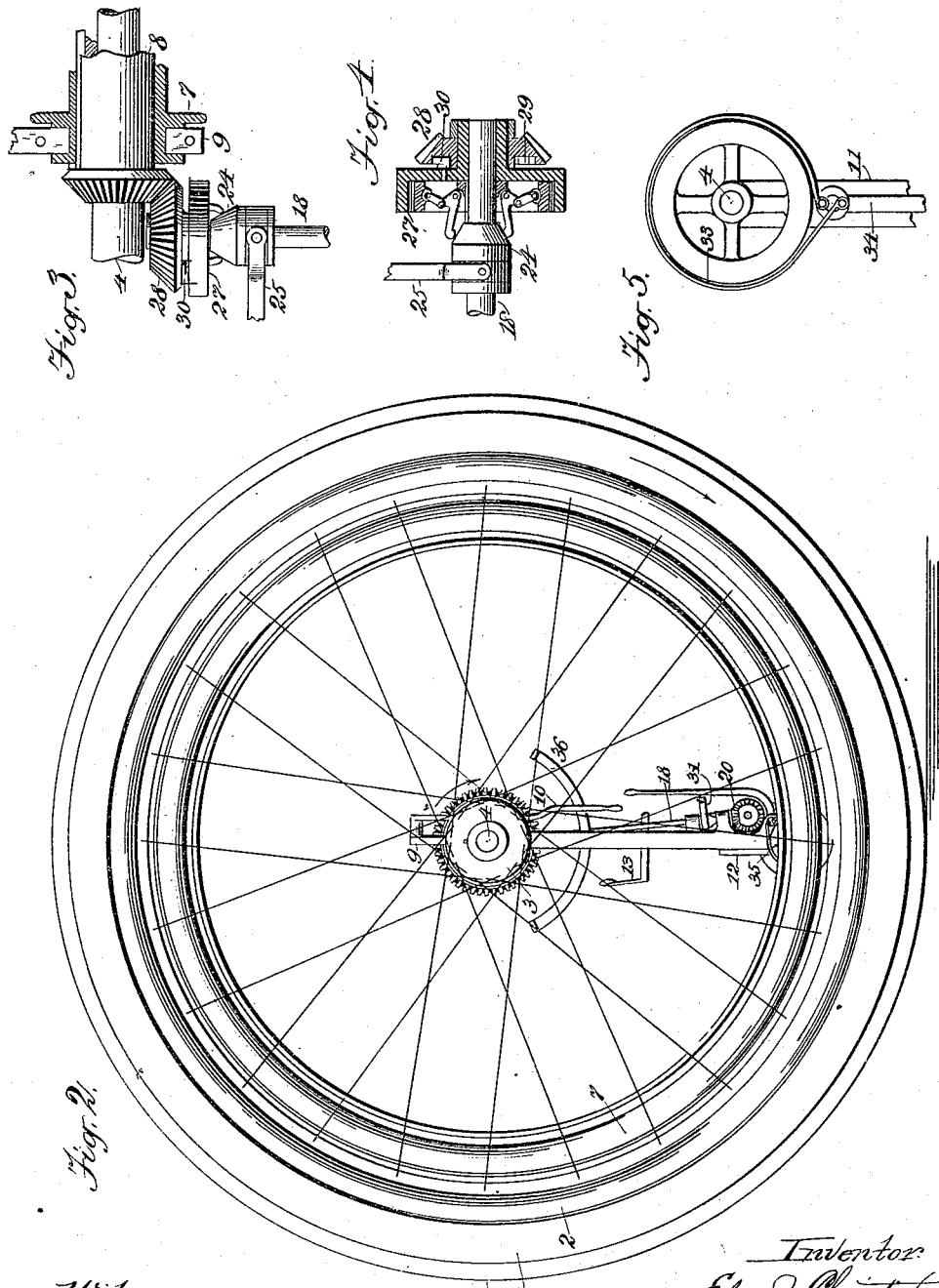

UNITED STATES PATENT OFFICE.

ELZA J. CHRISTIE, OF MARION, IOWA.

UNICYCLE.

1,191,566.  Specification of Letters Patent. Patented July 18, 1916.

Application filed July 6, 1914. Serial No. 849,182.

*To all whom it may concern:*

Be it known that I, ELZA J. CHRISTIE, a citizen of the United States, residing at Marion, in the county of Linn and State of Iowa, have invented certain new and useful Improvements in Unicycles; and I do hereby declare the following to be a full, clear, and exact description of the invention, such as will enable others skilled in the art to which it appertains to make and use the same.

This invention relates to unicycles, and more particularly to those of the type shown in Letters Patent No. 596,480, issued to me on the fourth day of January, 1898, to which reference may be had for certain details of construction not herein illustrated.

The object of this invention is to adapt the unicycle to use in connection with modern high-duty engines such as are commonly employed with automobiles and aeroplanes, and with a view to perfect control under all conditions, ranging from rest to a very high rate of speed, and involving more or less abrupt stops, starts and turns, such as may arise in traveling over the highway or racetrack.

The nature of the improvements will fully appear from the description and claims following, reference being had to the accompanying drawing, in which—

Figure 1 is a front view, partly in section, of a unicycle embodying my improvements. Fig. 2 is a side elevation of the same as seen from the left side of Fig. 1. Fig. 3 is a detail showing driving gear for one of the gyroscope or balance wheels. Fig. 4 shows a section of the same clutch and gear, the position being changed. Fig. 5 is a side view of one of the brakes. Fig. 6 shows detail of a variable speed device.

The unicycle, aside from its actuating mechanism, is in the main similar to that described and shown in the patent referred to. It comprises a traction wheel composed of a large ring 1, somewhat smaller side rings 2, and suitable hubs 3 tied together by wire spokes and guys to form a cage-like structure to contain the operative mechanism and the operator, the hubs being attached to a central axle 4. The central ring herein is shown with a detachable flange-ring 5, so that, when desired, the tire 6 may be removed, and the wheel, with the flange-ring replaced, may run on a single railway rail. Inside the structure so formed, and near each side, is mounted a pair of gyroscope or balance wheels 7. As the guiding of the traction wheel is effected by shifting these wheels to the right or left on the axle, they are splined slidably on sleeves 8, which turn freely on the axle, preferably on ball bearings, as shown specifically in said patent.

The wheels are connected operatively by a yoke 9, and to this connects a hand-lever 10 pivoted to some depending part of the mechanism, as to one of the hangers 11 which support the motor 12. Between the hangers depends the operator's seat 13. The motor herein shown is a four cylinder, high power gasolene engine of a familiar type, and transmits rotary motion to the balance wheels and to the main traction wheel substantially as follows: To the crank-shaft of the motor is secured a spur gear 14 meshing with a pinion 15 on a cross-shaft 16 journaled in bearings 17 of the hangers 11. The cross-shaft connects operatively with three vertical shafts, 18, 18 and 19 by bevel gearing 20, 20 and 21, respectively. These shafts are suitably journaled in bearings respectively numbered 22 and 23. The operative connection of the shafts 18 with the driven parts at the upper end is similar, and a description of one will serve for both. The construction is best shown in Figs. 3 and 4. To the shaft 18 is splined a sliding cone 24 operated in a familiar way by a hand-lever 25 pivoted at 26 to one of the hangers. The cone operates the jaws of a friction clutch 27 mounted to turn idly on the shaft 18 when not in use. Adjacent to the clutch is a bevel pinion 28 also loosely mounted (on the hub of the clutch, as herein shown), but made to positively engage the clutch in one direction of its movement by means of a ratchet 29 and pawl 30. The same device is applied to the shaft 19, but for convenience it is placed at the lower end, and is operated by a foot-lever 31 pivoted at 32.

It will now be seen that the motor may be started without load, the positive connection being only with the vertical shafts 18. When the motor has reached the desired speed the operator gradually clutches in one or both of the balance wheels. These must run at a high rate of speed, and the speed of the motor answering to it would be too high for the starting speed as applied to the traction wheel. Accordingly, when the balance wheels have attained a proper high speed, the motor is slowed down so that the operative connection with the traction wheel may be made in the same manner by means of the foot-lever 31. This is made possible by the ratchet and pawl connections above described, the balance wheels continuing to spin at high speed, though the speed of the motor has been reduced. When the desired speed of the traction wheel has been reached the balance wheels are again clutched in and the unicycle is in full operation.

Aside from the manipulation of the motor the unicycle is controlled by a brake 33. This may be of the familiar band and drum type, with an operating lever 34, as clearly shown in Figs. 1 and 5. Beside arresting the forward motion of the traction wheel the setting of this brake has the effect of swinging the entire depending apparatus (except the operator's seat) from a more or less elevated position in the forepart of the wheel to a corresponding position in the rear part of the wheel. This renders the unicycle very sensitive to the action of the steering apparatus, which as above noted is the balance wheels themselves as slid to the right or left on the central axle. Indeed if it were possible to bring the apparatus to this position with the unicycle at rest it could be made to turn in a horizontal plane on its own center by shifting the balance wheels sidewise on the axle. The brake thus becomes a useful aid in steering, especially in emergencies. For example in a race-course there are usually more or less abrupt turns which make it imperative to slacken speed.

By means of the apparatus above described the operator may near the short turn at a high speed, and when near it disengage clutches, set the brake and thus throw the depending mechanism to the rear, at the same time arresting the forward movement of the unicycle. He then shifts the balance wheels to the right or left, as the case may be, when the machine quickly takes the proper direction. He thereupon re-clutches the operative mechanism, and goes speeding on his way without having slackened the speed of the motor at all. It is desirable, but not indispensable, that a similar brake 35 be provided for the motor itself, though it will be noted that by reason of the ratchet and pawl driving connections this brake has no direct effect in arresting the speed of the unicycle or the balance wheels. It might happen, however, that in an emergency the operator would need to stop the motor suddenly, and in such a case a brake would be very useful.

As will be evident, the construction is such that the unicycle is driven positively forward, but in the event of any interruption to the proper action of the motor the forward movement of the operative mechanism is not arrested, a matter of great importance as a protection to the machine and its occupant. Because of the ease with which the unicycle may be turned, and the small space required therefor, any provision for backing it may be dispensed with. Provision is also made for utilizing the weight of the operator when the inclination of the suspended apparatus approaches the horizontal at the front or rear. This is shown as a curved arm 36 with terminal stops 37 to engage one of the suspenders of the operator's seat. The engagement of this additional weight tends to prevent the carrying of the apparatus above the horizontal center, when there would be danger of its being turned completely over.

For the purposes of the race-track the unicycle need not necessarily be provided with a variable speed. To adapt it more perfectly to use on the highway such a variable speed may be provided however, as shown in Fig. 6. In this figure the vertical shaft which drives the traction wheel is broken in the transmission housing 38, the upwardly continuing portion $19^a$ connecting with the other part 19 through direct gears 39 and change-gears 40 and 41, by means of a shifting lever 42. One pair of gears might be dispensed with, of course, by making the shaft 19 do duty as the jack-shaft 43.

Having thus described my invention, I claim:

1. In a unicycle, the combination of a motor, driving mechanism connected therewith and with the unicycle, a clutch adapted to make such connection, and means adapted to permit the unicycle to move normally, though clutched to the motor, in case of the stoppage of said motor.

2. In a unicycle having balance wheels, a suspended motor and mechanism adapted to transmit motion from the motor to the balance wheels and to the unicycle proper, and means adapted for separate and independent engagement of the motor with said balance wheels and unicycle.

3. In a unicycle having balance wheels substantially as described, a motor suspended from the main axle, driving mechanism adapted to impart rapid revolution to said balance wheels, a clutch to make operative engagement of said mechanism, and means to impart positive rotation of the balance wheels in one direction, but permitting them to spin independently of the motor.

4. In a unicycle having a motor and connecting driving mechanism suspended from the main axle, a brake for said axle, and an operating lever connecting the brake with the suspending apparatus, whereby the setting of the brake tends to swing said apparatus into the rear part of the unicycle.

5. In a unicycle having a motor and its driving mechanism and an operator's seat suspended from the main axle, means adapted to bring the operator's seat into engagement with said other suspended parts, substantially as and for the purpose set forth.

6. In a unicycle having a motor and its connected driving mechanism suspended from the main axle, an operator's seat independently so suspended, and means adapted to bring the seat and the other suspended apparatus into engagement when nearing the safe limit of its upward movement at the front or rear.

7. In a unicycle having a motor and driving mechanism suspended from the main axle balance wheels mounted slidably on said axle, means for shifting said wheels sidewise, a brake for said axle, and means for operating the same adapted to swing the suspended mechanism rearwardly.

8. In a unicycle having a motor and driving mechanism suspended from the axle, mechanism adapted to drive the unicycle forwardly, but permitting independent movement in the opposite direction, a brake for the main axle, and a brake connecting only with the motor.

9. In a unicycle having balance wheels, substantially as described, a suspended motor and mechanism adapted to transmit variable speed to said unicycle through the medium of a friction clutch and a variable drive connected therewith.

In testimony whereof I affix my signature in presence of two witnesses.

ELZA J. CHRISTIE .

Witnesses:
S. F. NOVOTNY,
GEO. P. CARPENTER.